United States Patent
Kim et al.

(10) Patent No.: US 11,923,580 B2
(45) Date of Patent: Mar. 5, 2024

(54) STAINLESS STEEL FOR FUEL CELL SEPARATOR PLATE AND MANUFACTURING METHOD THEREFOR

(71) Applicant: POSCO, Pohang-si (KR)

(72) Inventors: Kwang Min Kim, Pohang-si (KR); Jong Hee Kim, Daejeon (KR); Ki Hoon Jo, Pohang-si (KR); Bo Sung Seo, Pohang-si (KR)

(73) Assignee: POSCO CO., LTD, Gyeongsangbuk-Do Pohang-si (KR)

( * ) Notice: Subject to any disclaimer, the term of this patent is extended or adjusted under 35 U.S.C. 154(b) by 130 days.

(21) Appl. No.: 15/747,973

(22) PCT Filed: Jul. 29, 2016

(86) PCT No.: PCT/KR2016/007557
§ 371 (c)(1),
(2) Date: Jan. 26, 2018

(87) PCT Pub. No.: WO2017/052047
PCT Pub. Date: Mar. 30, 2017

(65) Prior Publication Data
US 2018/0219201 A1    Aug. 2, 2018

(30) Foreign Application Priority Data

Sep. 22, 2015  (KR) .................. 10-2015-0133565

(51) Int. Cl.
*H01M 8/1018* (2016.01)
*C22C 38/00* (2006.01)
(Continued)

(52) U.S. Cl.
CPC ......... *H01M 8/1018* (2013.01); *C22C 38/001* (2013.01); *C22C 38/02* (2013.01);
(Continued)

(58) Field of Classification Search
None
See application file for complete search history.

(56) References Cited

U.S. PATENT DOCUMENTS

| | | | | |
|---|---|---|---|---|
| 2003/0116536 A1* | 6/2003 | Ohtani | ............... | C23C 22/50 216/86 |
| 2010/0129697 A1* | 5/2010 | Jeon | ............... | C22C 38/008 429/514 |
| 2011/0294042 A1* | 12/2011 | Kim | ............... | C22C 38/001 429/516 |

FOREIGN PATENT DOCUMENTS

| | | |
|---|---|---|
| CN | 101646807 A | 2/2010 |
| EP | 2667439 A1 | 11/2013 |

(Continued)

OTHER PUBLICATIONS

International Search Report dated Oct. 21, 2016 issued in International Patent Application No. PCT/KR2016/007557 (with English translation).

(Continued)

*Primary Examiner* — Nathanael T Zemui
(74) *Attorney, Agent, or Firm* — Morgan, Lewis & Bockius LLP (57) ABSTRACT

Stainless steel for a fuel cell separator plate and a manufacturing method therefor are disclosed. The stainless steel for a fuel cell separator plate, according to one embodiment of the present invention, comprises: a stainless base material; and a passive film formed on the stainless base material, wherein a Cr/Fe atomic weight ratio in a 1 nm or less thickness region of the stainless base material, which is adjacent to an interface between the stainless and the passive film, is 0.45 or more. Therefore, by modifying the surface of the stainless steel for a fuel cell separator plate, a low interface contact resistance and a good corrosion resistance can be obtained, and a separate additional process such as (Continued)

precious metal coating can be removed, such that manufacturing costs are reduced and productivity can be improved.

4 Claims, 7 Drawing Sheets

(51) Int. Cl.
| | | |
|---|---|---|
| *C22C 38/02* | (2006.01) | |
| *C22C 38/04* | (2006.01) | |
| *C22C 38/18* | (2006.01) | |
| *C22C 38/20* | (2006.01) | |
| *C22C 38/22* | (2006.01) | |
| *C22C 38/26* | (2006.01) | |
| *C22C 38/28* | (2006.01) | |
| *C22C 38/42* | (2006.01) | |
| *C22C 38/44* | (2006.01) | |
| *C22C 38/48* | (2006.01) | |
| *C22C 38/50* | (2006.01) | |
| *C23F 1/28* | (2006.01) | |
| *C23G 1/08* | (2006.01) | |
| *C25F 3/06* | (2006.01) | |
| *C25F 5/00* | (2006.01) | |
| *H01M 8/021* | (2016.01) | |
| *H01M 8/0217* | (2016.01) | |
| *H01M 8/0228* | (2016.01) | |
| *H01M 8/1004* | (2016.01) | |

(52) U.S. Cl.
CPC .............. *C22C 38/04* (2013.01); *C22C 38/18* (2013.01); *C22C 38/20* (2013.01); *C22C 38/22* (2013.01); *C22C 38/26* (2013.01); *C22C 38/28* (2013.01); *C22C 38/42* (2013.01); *C22C 38/44* (2013.01); *C22C 38/48* (2013.01); *C22C 38/50* (2013.01); *C23F 1/28* (2013.01); *C23G 1/086* (2013.01); *C25F 3/06* (2013.01); *C25F 5/00* (2013.01); *H01M 8/021* (2013.01); *H01M 8/0219* (2013.01); *H01M 8/0228* (2013.01); *H01M 8/1004* (2013.01); *Y02P 70/50* (2015.11)

(56) References Cited

FOREIGN PATENT DOCUMENTS

| | | |
|---|---|---|
| JP | H08-269646 A | 10/1996 |
| JP | 2001-081542 A | 3/2001 |
| JP | 2004-149920 A | 5/2004 |
| JP | 2004-269969 A | 9/2004 |
| JP | 2013-129896 A | 7/2013 |
| KR | 10-2005-0009232 A | 1/2005 |
| KR | 10-0777123 B1 | 11/2007 |
| KR | 10-2009-0066866 A | 6/2009 |
| KR | 10-2010-0080379 A | 7/2010 |
| KR | 10-2012-0073648 A | 7/2012 |
| KR | 2014-0081161 A | 7/2014 |
| WO | 2008/130078 A1 | 10/2008 |

OTHER PUBLICATIONS

Korean Notice of Allowance dated Nov. 8, 2017 issued in Korean Patent Application No. 10-2015-0133565 (with English Abstract).
Korean Office Action dated Jul. 31, 2017 issued in Korean Patent Application No. 10-2015-0133565.
Japanese Notice of Refusal dated Apr. 9, 2019 issued in Japanese Patent Application No. 2018-511221 (with English translation).
Extended European Search Report dated Jul. 6, 2018 issued in European Patent Application No. 16848773.4.
Canadian Office Action dated May 7, 2019 issued in Canadian Patent Application No. 2997544.
Chinese Office Action dated Feb. 25, 2020 issued in Chinese Patent Application No. 201680047623.1.

\* cited by examiner

STAINLESS STEEL FOR FUEL CELL SEPARATOR PLATE AND MANUFACTURING METHOD THEREFOR

CROSS REFERENCE

This patent application is the U.S. National Phase under 35 U.S.C. § 371 of International Application No. PCT/KR2016/007557, filed on Jul. 29, 2016, which claims the benefit of Korean Patent Application No. 10-2015-0133565, filed on Sep. 22, 2015, the entire contents of each are hereby incorporated by reference.

TECHNICAL FIELD

Embodiments of the present disclosure relate to a stainless steel for a fuel cell separator plate and a manufacturing method therefor, and more particularly, to a stainless steel for a fuel cell separator plate capable of ensuring excellent contact resistance and a high corrosion potential by a non-conductive film formed on a surface of the stainless steel being removed and a new conductive film being formed on the surface of the stainless steel, and a manufacturing method therefor.

BACKGROUND ART

A solid polymer fuel cell is a fuel cell in which a polymer membrane having hydrogen ion exchange characteristics is used as an electrolyte, and thus has a low operating temperature of approximately 80° C. and high efficiency in comparison to other types of fuel cells. Also, the solid polymer fuel cell may be used for vehicles and used in a home because the solid polymer fuel cell operates quickly and has a high power density and a simple battery body structure.

Such a solid polymer fuel cell is composed of main components such as a polymer electrolyte membrane, an electrode, and a separator plate constituting a stack. In the solid polymer fuel cell, the separator plate functions to block reactive gases such as a hydrogen gas and an oxygen gas from being mixed, electrically connect a membrane electrode assembly (MEA), and support the MEA to maintain a shape of the fuel cell. Therefore, the separator plate should have a very airtight structure such that two gases are not mixed, have excellent electrical conductivity to serve as a conductor, and have sufficient mechanical strength to serve as a support. In the prior art, a graphite material is generally used as a material of a separator plate to cope with a strongly corrosive environment in a fuel cell. Recently, a Ti alloy or stainless steel has been applied and used in consideration of manufacturing costs and weights of fuel cells.

When stainless steel is used as the separator plate of the polymer fuel cell, a 0.1 mm-thick stainless steel sheet is generally used thereas. In this case, such a stainless steel sheet is manufactured using a cold rolling process and a bright annealing heat treatment process.

Generally, a ferrite-based stainless steel cold-rolled coil having a thickness of 0.3 mm or more and containing 26% by weight (wt %) of Cr may be subjected to cold rolling followed by an annealing heat treatment under an oxidizing atmosphere, and may then be acid-pickled through processes such as neutral salt electrolytic pickling, nitric acid electrolysis, and being dipped into a mixed acid bath containing nitric acid and hydrofluoric acid.

However, the ferrite-based stainless steel cold-rolled coil having a thickness of less than 0.3 mm and containing 26 wt % of Cr is subjected to bright annealing heat treatment under a reducing atmosphere containing hydrogen (70% or more) and nitrogen to prevent recrystallization and remove stress without undergoing an annealing heat treatment under an oxidizing atmosphere to prevent a difficulty in controlling coil tension after cold rolling, surface defects such as pressing defects, and the like.

Because such a bright annealing heat treatment is performed by heat-treating the cold-rolled coil under a reducing atmosphere, the cold-rolled coil is manufactured into a stainless steel sheet having a several nm-thick passive film formed thereon, and the passive film has a smooth surface state rather than the form of a several μm-thick high-temperature oxidized scale formed under a typical oxidizing atmosphere. Because the passive film formed by means of such a bright annealing process has a high resistance value, a post-treatment process for improving interfacial contact resistance and corrosion resistance is needed to use the bright-annealed stainless steel as a fuel cell separator plate.

As such a post-treatment process, a process of further coating a surface of the stainless steel with a precious metal such as gold (Au) to reduce the interfacial contact resistance, or a process of further coating the surface of the stainless steel with a nitride has been generally proposed.

However, such a method has a drawback in that an increase in manufacturing costs and time is caused due to an additional process for coating the surface of the stainless steel with the precious metal or the nitride, resulting in degraded productivity. Also, the method has a problem in that it is difficult to mass-produce a molded separator plate because the molded separator plate is coated in pieces.

In the related art, a method of manufacturing a stainless steel for a polymer electrolyte membrane fuel cell separator plate having a low interfacial contact resistance and a high corrosion potential by controlling acid pickling conditions after bright annealing is specifically disclosed in "Method of Manufacturing Stainless Steel for PEMFC Bipolar Plate" (Korean Patent Publication No. 10-2014-0081161). When the passive film is acid-pickled using a nitric acid solution according to such a manufacturing method, the method has a drawback in that a lot of time is taken to perform a post-treatment process due to low acid pickling efficiency.

DISCLOSURE

Technical Problem

The present disclosure is directed to providing a stainless steel for a fuel cell separator plate capable of ensuring excellent contact resistance and a high corrosion potential by a non-conductive film formed on a surface of the stainless steel being removed and a new conductive film being formed on the surface of the stainless steel.

The present disclosure is also directed to providing a method of manufacturing a stainless steel for a fuel cell separator plate.

Technical Solution

In accordance with one aspect of the present disclosure, a stainless steel for a fuel cell separator plate includes a stainless base material and a passive film formed on the stainless base material, wherein a region of the stainless base material having a thickness of 1 nm or less, which is adjacent to an interface between the stainless base material and the passive film, has a Cr/Fe atomic weight ratio of 0.45 or more.

In accordance with one exemplary embodiment of the present disclosure, the stainless steel for a fuel cell separator plate may include C at greater than 0 to 0.02% by weight (wt %), N at greater than 0 to 0.02 wt %, Si at greater than 0 to 0.4 wt %, Mn at greater than 0 to 0.2 wt %, P at greater than 0 to 0.04 wt %, S at greater than 0 to 0.02 wt %, Cr at 25 to 34 wt %, Mo at 0 to less than 0.1 wt %, Cu at 0 to 1 wt %, Ni at 0 to less than 0.2 wt %, Ti at greater than 0 to 0.5 wt %, Nb at greater than 0 to 0.5 wt %, and the balance of Fe and other inevitable impurities.

In accordance with one exemplary embodiment of the present disclosure, the Cr/Fe atomic weight ratio at the interface between the stainless steel base material and the passive film may be greater than or equal to 0.65.

In accordance with one exemplary embodiment of the present disclosure, the Cr/Fe atomic weight ratio in the passive film may be greater than or equal to 1.0.

In accordance with one exemplary embodiment of the present disclosure, a content of Si atoms in the passive film may be less than or equal to 0.1 at %.

In accordance with one exemplary embodiment of the present disclosure, the passive film may have a thickness of 3.5 nm or less (excluding 0).

In accordance with one exemplary embodiment of the present disclosure, the passive film may have an interfacial contact resistance of 10 mΩcm² (100 N/cm²) or less.

In accordance with one exemplary embodiment of the present disclosure, the passive film may have a corrosion potential of 0.3 $V_{SCE}$ or more.

In accordance with another aspect of the present disclosure, a method of manufacturing a stainless steel for a fuel cell separator plate, which includes subjecting a stainless steel sheet to bright annealing to form a first passive film on a stainless base material (a heat treatment step), and modifying the first passive film to form a second passive film on the stainless base material (a modification step), wherein a region of the stainless base material having a thickness of 1 nm or less, which is adjacent to an interface between the stainless base material and the passive film, has a Cr/Fe atomic weight ratio of 0.45 or more.

In accordance with one exemplary embodiment of the present disclosure, the stainless steel sheet may include C at greater than 0 to 0.02 wt %, N at greater than 0 to 0.02 wt %, Si at greater than 0 to 0.4 wt %, Mn at greater than 0 to 0.2 wt %, P at greater than 0 to 0.04 wt %, S at greater than 0 to 0.02 wt %, Cr at 25 to 34 wt %, Mo at 0 to less than 0.1 wt %, Cu at 0 to 1 wt %, Ni at 0 to less than 0.2 wt %, Ti at greater than 0 to 0.5 wt %, Nb at greater than 0 to 0.5 wt %, and the balance of Fe and other inevitable impurities.

In accordance with one exemplary embodiment of the present disclosure, the modification step may include electrolytically treating the first passive film at a first current density in a sulfuric acid solution (a first film modification step), electrolytically treating the first passive film at a second current density, which is less than or equal to the first current density, in the sulfuric acid solution (a second film modification step), and dipping the first passive film in a mixed acid solution including nitric acid and hydrofluoric acid (a third film modification step), wherein the first film modification step and the second film modification step may be sequentially performed.

In accordance with one exemplary embodiment of the present disclosure, in the first film modification step, a potential of the stainless steel sheet corresponding to the first current density may satisfy the following Expressions (1) and (2).

$$E_{anode} \geq 1.0 \quad \text{Expression (1)}$$

$$|E_{anode}| + |E_{cathode}| \geq 2.0 \quad \text{Expression (2)}$$

In accordance with one exemplary embodiment of the present disclosure, in the first film modification step and the second film modification step, the sulfuric acid solution may have a concentration of 50 to 300 g/L, and the sulfuric acid solution may have a temperature of 40 to 80° C.

In accordance with one exemplary embodiment of the present disclosure, in the third film modification step, a concentration of the nitric acid in the mixed acid solution may be in a range of 100 to 200 g/L, a concentration of the hydrofluoric acid may be less than or equal to 70 g/L, and a temperature of the mixed acid solution may be in a range of 40 to 60° C.

In accordance with one exemplary embodiment of the present disclosure, in the first film modification step and the second film modification step, the sulfuric acid solution may be allowed to flow in an electrolytic bath containing the sulfuric acid solution to remove bubbles generated on surfaces of an electrode and the stainless steel sheet.

In accordance with one exemplary embodiment of the present disclosure, the First passive film may have an interfacial contact resistance of greater than 10 mΩcm² (100 N/cm²), and the second passive film may have an interfacial contact resistance of 10 mΩcm² (100 N/cm²) or less.

In accordance with one exemplary embodiment of the present disclosure, the Cr/Fe atomic weight ratio at the interface between the stainless steel base material and the second passive film may be greater than or equal to 0.65.

In accordance with one exemplary embodiment of the present disclosure, the Cr/Fe atomic weight ratio in the second passive film may be greater than or equal to 1.0.

In accordance with one exemplary embodiment of the present disclosure, the second passive film may have a thickness of 3.5 nm or less (excluding 0).

Advantageous Effects

In accordance with the embodiments of the present disclosure, a surface of the stainless steel for a fuel cell separator plate can be modified to achieve low interfacial contact resistance and excellent corrosion resistance, and manufacturing costs can be reduced and productivity can be improved because separate additional processes such as precious metal coating and the like can be omitted.

MODES OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

A stainless steel for a fuel cell separator plate in accordance with one exemplary embodiment of the present disclosure includes a stainless base material and a passive film formed on the stainless base material. Here, a region of the stainless base material having a thickness of 1 nm or less and which is adjacent to an interface between the stainless base material and the passive film has a Cr/Fe atomic weight ratio of 0.45 or more.

Hereinafter, embodiments of the present disclosure will be described in detail with reference to the accompanying drawings. However, it should be understood that the following description is designed to impart the scope of the present disclosure to a person having ordinary skill in the art to which the present disclosure belongs. It should be apparent that the present disclosure is not limited to the embodiments disclosed below and can be implemented in various forms. In the drawings, parts unrelated to the detailed description are omitted to describe the present disclosure more clearly, and the shapes and dimensions of the parts in the drawings may be shown in an exaggerated way for better understanding of the present disclosure.

Figure 1:
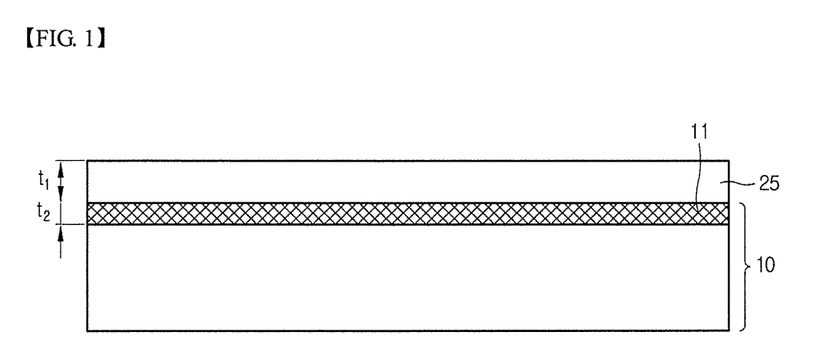
FIG. 1 is a cross-sectional view of a stainless steel for a fuel cell separator plate in accordance with one exemplary embodiment of the present disclosure.

FIG. 1 is a cross-sectional view of a stainless steel for a fuel cell separator plate in accordance with one exemplary embodiment of the present disclosure.

Referring to FIG. 1, the stainless steel for a fuel cell separator plate in accordance with one exemplary embodiment of the present disclosure includes a stainless base material 10 and a passive film 25 formed on the stainless base material 10.

The stainless steel includes more than 0 to 0.02% by weight (wt %) of carbon (C), more than 0 to 0.02 wt % of nitrogen (N), more than 0 to 0.4 wt % of silicon (Si), more than 0 to 0.2 wt % of manganese (Mn), more than 0 to 0.04 wt % of phosphorus (P), more than 0 to 0.02 wt % of sulfur (S), 25 to 34 wt % of chromium (Cr), less than 0.1 wt % of molybdenum (Mo), 0 to 1 wt % of copper (Cu), 0 to less than 0.2 wt % of nickel (Ni), more than 0 to 0.5 wt % of titanium (Ti), more than 0 to 0.5 wt % of niobium (Nb), and the remaining weight is iron (Fe) and other inevitable impurities.

Hereinafter, the reasons for the numeric limitation of contents of components in exemplary embodiments of the present disclosure will be described. Unless particularly defined otherwise in this specification, units refer to "wt %."

Carbon (C) and nitrogen (N) form a chromium (Cr) carbonitride in steel. As a result, lower content of both of the elements is preferably due to reduced corrosion resistance of a chromium (Cr)-deficient layer.

Therefore, composition ratios of C and N are preferably limited to 0.02 wt % (excluding 0) and 0.02 wt % (excluding 0) in the present disclosure.

Silicon (Si) is an element effective for deacidification, but reduces toughness and inhibits moldability of stainless steel. Therefore, a composition ratio of silicon (Si) is preferably limited to 0.4 wt % or less in the present disclosure.

Manganese (Mn) is an element that enhances deacidification, but inclusions such as MnS reduce corrosion resistance of stainless steel. Therefore, a composition ratio of manganese (Mn) is preferably limited to 0.2 wt % or less in the present disclosure.

Phosphorus (P) reduces corrosion resistance and toughness of stainless steel. Therefore, a composition ratio of phosphorus (P) is preferably limited to 0.04 wt % or less in the present disclosure.

Sulfur (S) forms MnS, which acts as a starting point for corrosion that reduces corrosion resistance of stainless steel. Therefore, a composition ratio of sulfur (S) is preferably limited to 0.02 wt % or less in consideration of these facts in the present disclosure.

A content of chromium (Cr) is limited to 26 wt % or more because Cr is an element that may prevent elution of iron (Fe) during operation of a fuel cell to ensure corrosion resistance and a desired interfacial contact resistance in the present disclosure. In this case, when the content of chromium (Cr) is less than 26 wt %, performance of the fuel cell may be degraded due to the elution of iron (Fe).

More preferably, the content of chromium (Cr) is limited to 34 wt % or more because an excessive increase in strength of stainless steel causes degradation of moldability during manufacture of a separator plate for a polymer fuel cell when the content of chromium (Cr) is greater than 34 wt %.

Molybdenum (Mo) is an element that is added to stainless steel to improve corrosion resistance, especially pitting corrosion resistance, thereof. However, when a large amount of molybdenum (Mo) is added thereto, processability thereof may be degraded. Therefore, molybdenum (Mo) is preferably added to stainless steel at a content of 0.1 wt % or less.

Copper (Cu) serves to enhance corrosion resistance of stainless steel under an acidic atmosphere at which a fuel cell operates. However, when an excessive amount of copper (Cu) is added to stainless steel, performance of the fuel cell may be degraded and moldability of the stainless steel may also be deteriorated due to elution of copper (Cu).

Therefore, a composition ratio of copper (Cu) is preferably limited to 0% to 2 wt % or less in consideration of these facts in the present disclosure.

Nickel (Ni) serves to partially reduce contact resistance of stainless steel. However, when a large amount of nickel (Ni) is added to stainless steel, elution of nickel (Ni) and degradation of moldability thereof may be caused.

Therefore, a composition ratio of nickel (Ni) is preferably limited to 0.8 wt % or less in consideration of these facts in the present disclosure.

Titanium (Ti) and niobium (Nb) are elements that are effective in forming carbon (C) and nitrogen (N) in stainless steel into carbonitrides, but act to degrade toughness of the steel. Therefore, a composition ratio of each of the elements is preferably limited to 0.5 wt % or less in consideration of these facts in the present disclosure.

In a cold rolling step, a stainless steel sheet having the above contents is manufactured into a cold-rolled sheet using a cold rolling mill (i.e., a Z-mill). Thereafter, in a heat treatment step, the cold-rolled sheet is subjected to a bright annealing heat treatment to form a passive film on a surface of the cold-rolled sheet.

The bright annealing heat treatment refers to an annealing process that is performed under a non-oxidizing atmosphere. A coil having a thickness of 0.3 mm or less is subjected to the bright annealing heat treatment under a reducing atmosphere including hydrogen and nitrogen in order to prevent a difficulty in controlling coil tension and pressing defects. In this case, the content of hydrogen is preferably 70 wt % or more.

As described above, because the bright annealing heat treatment is performed under the reducing atmosphere, a several nm-thick passive film having a smooth surface state may be formed. In this case, a Cr—Fe oxide, a Mn oxide, a Si oxide, a Nb oxide, and the like may be formed on such a passive film.

The cold-rolled sheet undergoing the bright annealing heat treatment process has its interfacial contact resistance enhanced due to the several nm-thick passive film formed on a surface of the cold-rolled sheet.

Therefore, new films, which are conductive when a non-conductive passive film present on a surface of the stainless steel sheet is removed, are needed to use the bright-annealed stainless steel sheet as a fuel cell separator plate.

Accordingly, the stainless steel for a fuel cell separator plate in accordance with one exemplary embodiment of the present disclosure includes the stainless base material 10 and the passive film 25 formed on the stainless base material 10. Here, a region 11 of the stainless base material 10 having a thickness of 1 nm or less and which is adjacent to an interface between the stainless base material 10 and the passive film 25 has a Cr/Fe atomic weight ratio of 0.45 or more.

Here, the interface between the stainless base material 10 and the passive film 25 refers to a point at which a content of oxygen accounts for 50% of the maximum content of oxygen after an elemental distribution is determined in a thickness direction of the stainless steel sheet.

Also, a Cr/Fe atomic weight ratio at the interface between the stainless steel base material 10 and the passive film 25 is 0.65 or more.

Also, a Cr/Fe atomic weight ratio in the passive film 25 is 1.0 or more. In a process of manufacturing a stainless steel for a fuel cell separator plate in accordance with one exemplary embodiment of the present disclosure, a non-conductive passive film formed by means of the bright annealing heat treatment is removed, Fe is eluted, and Cr is concentrated at a region adjacent to a surface of the stainless base material 10. Therefore, the region 11 of the stainless base material 10 having a thickness of 1 nm or less and which is adjacent to the interface between the stainless base material 10 and the passive film 25 may have a Cr/Fe atomic weight ratio of 0.45 or more.

Accordingly, a Cr concentration of the passive film 25 may increase. Finally, the Cr/Fe atomic weight ratio in the passive film 25 may be 1.0 or more.

As the Cr/Fe atomic weight ratio of the passive film 25 increases, formation of insulating voids in the passive film 25 may be inhibited while corrosion resistance may be improved.

Therefore, an interfacial contact resistance of the passive film 25 is 10 mΩcm² (100 N/cm²) or less. More preferably, the interfacial contact resistance of the passive film 25 is 5 mΩcm² (100 N/cm²) or less.

For example, the passive film 25 may have a thickness (t1) of 3.5 nm or less (excluding 0). As the passive film 25 is manufactured in the form of a thin film having a thickness of 3.5 nm or less, a passive thin film having semiconductive characteristics close to a typical insulating property may be manufactured, thereby reducing contact resistance of the passive film 25.

For example, the passive film 25 may have a corrosion potential of 0.3 $V_{SCE}$ or more. Meanwhile, evaluation of the corrosion potential is as follows. A manufactured 0.1 mm-thick steel sheet material is cut into pieces having a certain area (cm²), and dipped into a mixed solution, in which a concentration of 1 mole of sulfuric acid is mixed with 2 ppm of a hydrofluoric acid solution, at 70° C. under a fuel cell-operating environment to evaluate a potential of the material with respect to a saturated calomel electrode (SCE) serving as a reference electrode. That is, the stainless steel in accordance with one exemplary embodiment of the present disclosure may have a corrosion potential of 0.3 $V_{SCE}$ with respect to the SCE serving as the reference electrode.

For example, a content of Si atoms in the passive film 25 may be 0.1 at % or more. Measurement of the content of Si atoms in the passive film may be performed by measuring the manufactured 0.1 mm-thick steel sheet material using X-ray photoelectron spectroscopy (XPS). Si is an insulating material, and thus a content of Si may be reduced to improve conductivity of the passive film 25.

Figure 4:
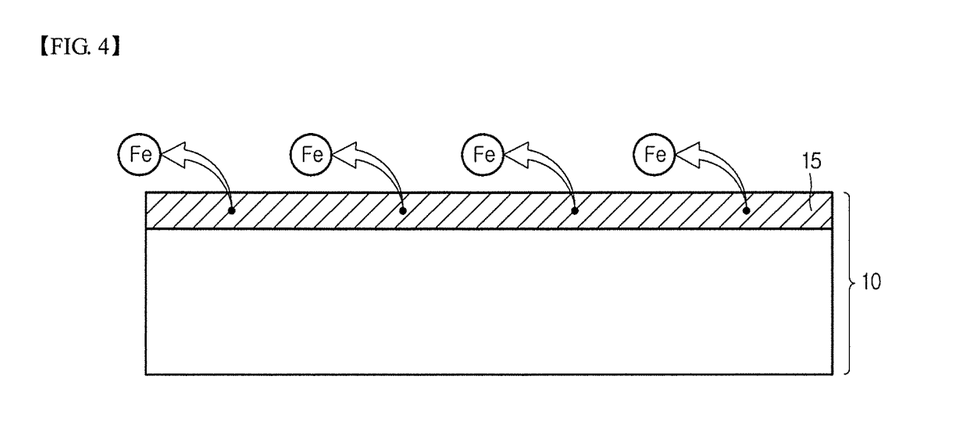
Figure 5:
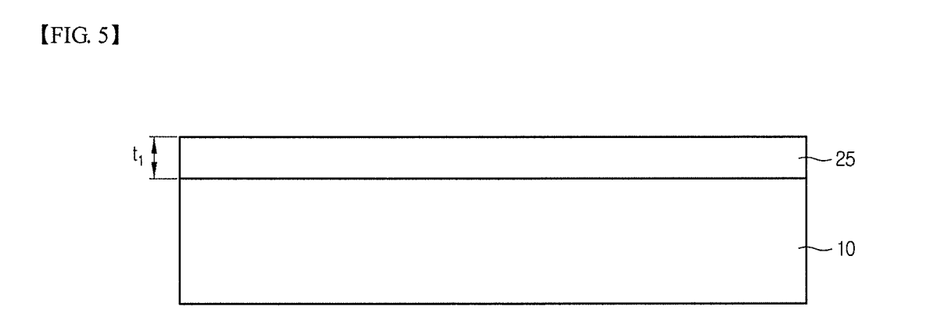
Figure 6:
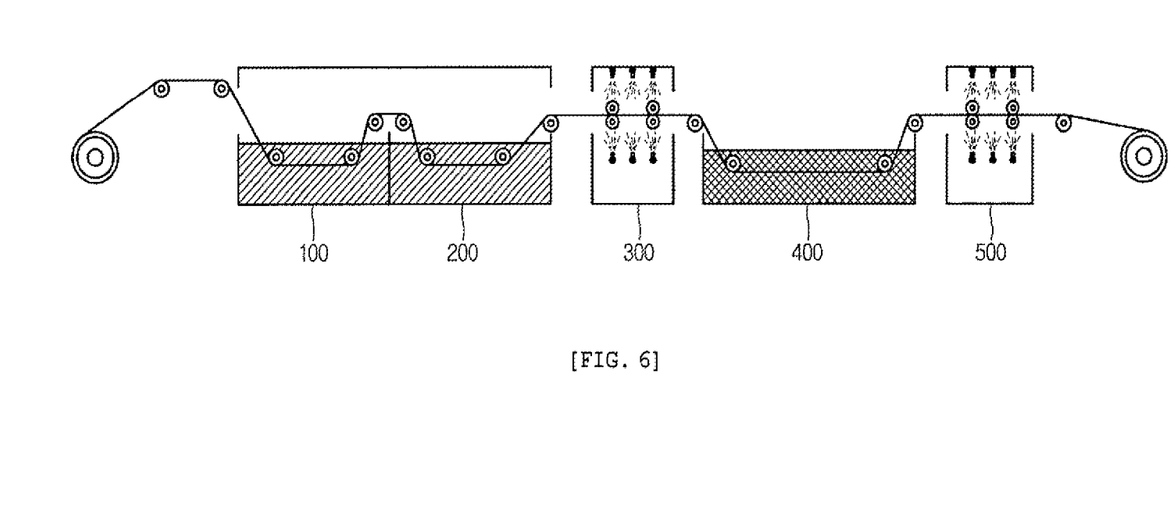
FIG. 6 is a schematic diagram of facilities configured to manufacture a stainless steel for a fuel cell separator plate in accordance with one exemplary embodiment of the present disclosure.
Figure 7:
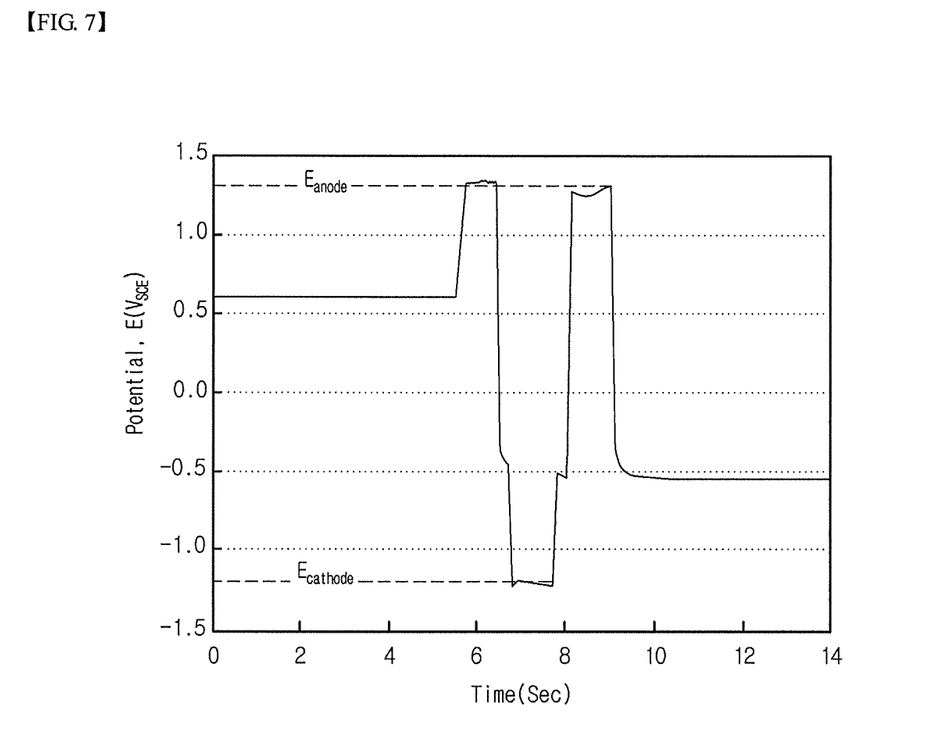
FIG. 7 is a graph illustrating a change in potential of stainless steel corresponding to an applied current density in a first film modification step for a ferrite-based stainless sheet including 30% by weight (wt %) of Cr in accordance with one exemplary embodiment of the present disclosure.

FIGS. 2 to 5 are cross-sectional views for explaining a process of manufacturing a stainless steel for a fuel cell separator plate in accordance with one exemplary embodiment of the present disclosure. FIG. 6 is a schematic diagram of facilities configured to manufacture a stainless steel for a fuel cell separator plate in accordance with one exemplary embodiment of the present disclosure. FIG. 7 is a graph illustrating a change in potential of stainless steel corresponding to an applied current density in a first film modification step for a ferrite-based stainless sheet including 30 wt % of Cr in accordance with one exemplary embodiment of the present disclosure.

Hereinafter, a process of manufacturing a stainless steel for a fuel cell separator plate in accordance with one exemplary embodiment of the present disclosure will be described with reference to FIGS. 1 to 7.

Figure 2:
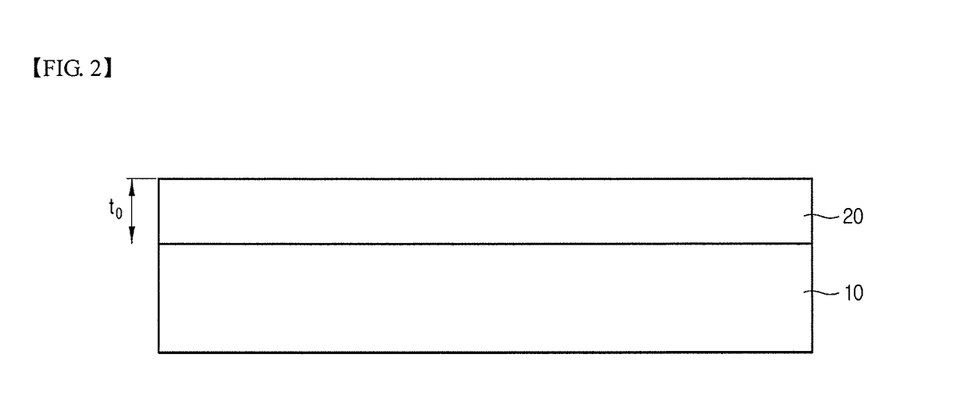
FIGS. 2 to 5 are cross-sectional views for explaining a process of manufacturing a stainless steel for a fuel cell separator plate in accordance with one exemplary embodiment of the present disclosure.

A heat treatment step includes subjecting a stainless steel sheet to bright annealing to form a first passive film 20 on a stainless base material 10.

Because the bright annealing heat treatment is performed by heat-treating the stainless steel under a reducing atmosphere, a cold-rolled coil is manufactured into a stainless steel sheet having a several nm-thick passive film formed thereon, and the passive film has a smooth surface state rather than the form of a several μm-thick high-temperature oxidized scale formed under a typical oxidizing atmosphere. However, the several nm-thick passive film formed during the bright annealing heat treatment exhibits high electrical resistivity characteristics due to semiconductive characteristics and has a drawback in that performance of a fuel cell may be degraded due to high interfacial contact resistance when the passive film is used as a separator plate of the fuel cell. Therefore, an additional post-treatment process is needed to improve interfacial contact resistance and corrosion resistance of the passive film formed during the bright annealing heat treatment.

The stainless steel sheet includes more than 0 to 0.02 wt % of C, more than 0 to 0.02 wt % of N, more than 0 to 0.4 wt % of Si, more than 0 to 0.2 wt % of Mn, more than 0 to 0.04 wt % of P, more than 0 to 0.02 wt % of S, 25 to 34 wt % of Cr, 0 to less than 0.1 wt % of Mo, 0 to 1 wt % of Cu, 0 to less than 0.2 wt % of Ni, more than 0 to 0.5 wt % of Ti, more than 0 to 0.5 wt % of Nb, and the remaining weight is Fe and other inevitable impurities. Here, description of the components is as described above.

Accordingly, in the method of manufacturing a stainless steel for a fuel cell separator plate in accordance with the present disclosure, a conductive passive film may be formed in the form of a thin film via the following processes.

To form such a conductive passive film, the first passive film 20 is modified to form a second passive film 25 on the stainless base material 10.

The first passive film 20 is electrolytically treated at a first current density in a sulfuric acid solution (a first film modification step 100), electrolytically treated at a second current density, which is the first current density or less, in the sulfuric acid solution (a second film modification step 200), and dipped into a mixed acid solution including nitric acid and hydrofluoric acid (a third film modification step 400).

In this case, the first film modification step 100 and the second film modification step 200 may be sequentially performed.

Figure 3:
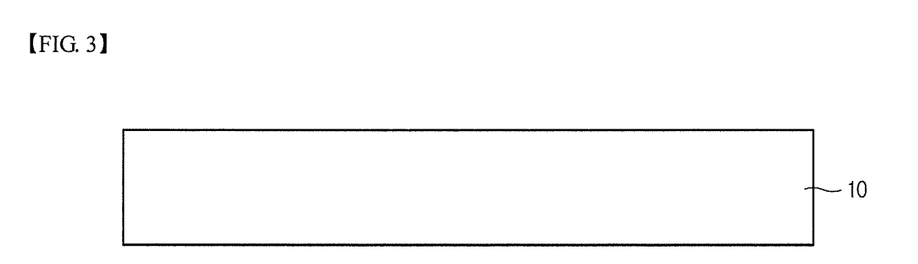

That is, referring to FIGS. 2 to 4, when the stainless steel sheet in which the first passive film 20 is formed on the stainless base material 10 is subjected to the first film modification step 100, the first passive film 20 is removed. Fe adjacent to a surface of the stainless base material 10 is selectively eluted while the stainless base material 10 from which the first passive film 20 is removed is subjected to the second film modification step 200. Therefore, Cr is concentrated on a surface of the stainless base material 10 to form a chromium-concentrated layer 15.

In both the first film modification step 100 and the second film modification step 200, the first passive film 20 is electrolytically treated in the sulfuric acid solution. In the first film modification step 100, the first passive film 20 is electrolytically treated at the first current density. In the second film modification step 200, the first passive film 20 is electrolytically treated at the second current density, which is the first current density or less.

In the first film modification step 100, a potential of the stainless steel sheet corresponding to the first current density satisfies Expressions (1) and (2) below.

$$E_a \geq 1.0 \qquad \text{Expression (1)}$$

$$|E_{anode}| + |E_{cathode}| \geq 2.0 \qquad \text{Expression (2)}$$

In the first film modification step 100, an electric current having the first current density, at which the sum of absolute values of $E_{anode}$ and $E_{cathode}$ is 2.0 $V_{SCE}$ or more when anode and cathode electrodes are alternately electrolytically treated, or at which $E_{anode}$ is 1.0 $V_{SCE}$ or more when only the cathode electrode is electrolytically treated, is preferably applied to the stainless steel sheet.

When the sum of absolute values of $E_{anode}$ and $E_{cathode}$ is 2.0 $V_{SCE}$ or more or $E_{anode}$ is 1.0 $V_{SCE}$ or more, anodic dissolution of the stainless steel occurs in a high potential region of +1.0 $V_{SCE}$ or more, and thus an entire surface of the passive film is uniformly dissolved. Therefore, the non-conductive passive film may be uniformly removed while erosion of the stainless steel base material is inhibited.

In this case, when the sum of absolute values of $E_{anode}$ and $E_{cathode}$ is to 2.0 $V_{SCE}$ or less or $E_{anode}$ is 1.0 $V_{SCE}$ or less, the passive film may be unevenly removed, resulting in decreased effect in reducing contact resistance.

Referring to FIG. 7, in the first film modification step for the ferrite-based stainless sheet including 30 wt % of Cr in accordance with one exemplary embodiment of the present disclosure, a change in potential of the stainless steel corresponding to the applied current density is measured. Based on these facts, it can be seen that the $E_{anode}$ value is 1.0 or more, or that the sum of the $|E_{anode}|$ and $|E_{cathode}|$ values 2.0 or more. Also, it can be seen that anodic dissolution occurs in a high potential region of +1.0 $V_{SCE}$ or more during the electrolytic treatment.

For example, in the first film modification step 100, a concentration of the sulfuric acid solution is preferably adjusted to be in a range of 50 to 300 g/L and a temperature of the sulfuric acid solution is preferably adjusted to be in a range of 40 to 80° C.

When the concentration of the sulfuric acid solution is less than 50 g/L, the bright-annealed first passive film 20 formed on a surface of the stainless steel sheet may not be sufficiently removed. Also, even when the concentration of the sulfuric acid solution is greater than 300 g/L, an effect of removing the first passive film 25 is saturated. Therefore, the concentration of the sulfuric acid solution is preferably controlled to be 300 g/L or less in consideration of economic feasibility of electrolytic treatment.

When the temperature of the sulfuric acid solution is less than 40° C., an effect of removing the passive film may be degraded. In this case, an upper limit of the temperature is preferably limited to 80° C. in consideration of safety.

After the first film modification step 100, the second film modification step 200 includes electrolytically re-treating the stainless steel sheet from which the first passive film 20 is removed in the sulfuric acid solution to increase a Cr ratio on a surface of the stainless base material 10.

The second current density, which is a current density in the second film modification step 200, may be the first current density, which is the current density in the first film modification step 100, or less. More preferably, the second current density, which is the current density in the second film modification step 200, may be less than the first current density, which is the current density in the first film modification step 100.

Because the bright-annealed first passive film 25 is removed in the first film modification step 100, the stainless steel base material 10 is exposed to the outside in the second film modification step 200. Therefore, when the current density in the second film modification step 200 is higher than the current density in the first film modification step 100, serious elution of the base material may occur, which makes it difficult to expect an effect of increasing the Cr ratio on the surface of the stainless base material 10. Therefore, a lower current density may be applied in the second film modification step 200 than in the first film modification step 100 so that a proper selective elution of Fe occurs to increase the Cr ratio on the surface of the stainless base material 10, thereby forming the chromium-concentrated layer 15.

For example, in the second film modification step 200, the concentration of the sulfuric acid solution is preferably adjusted to be in the range of 50 to 300 g/L, and the temperature of the sulfuric acid solution is preferably adjusted to be in the range of 40 to 80° C.

When the concentration of the sulfuric acid solution is less than 50 g/L, an increase in the Cr ratio on the surface of the stainless base material 10 may be insufficient due to a small amount of selectively eluted Fe in the stainless steel base material 10. Also, when the concentration of the sulfuric acid solution is greater than 300 g/L, it is difficult to expect an effect of increasing the Cr ratio on the surface of the stainless base material 10 due to serious erosion of the stainless steel base material.

When the temperature of the sulfuric acid solution is less than 40° C., an effect of increasing the Cr ratio on the surface of the stainless base material 10 may be degraded. In this case, an upper limit of the temperature is preferably limited to 80° C. in consideration of safety.

Also, while the first film modification step 100 and the second film modification step 200 are performed, the sulfuric acid solution may be allowed to flow in an electrolytic bath containing the sulfuric acid solution to remove bubbles generated on surfaces of an electrode and the stainless steel sheet.

In the first film modification step 100 and the second film modification step 200, the bubbles generated on the electrodes and the surface of the stainless steel sheet during the electrolytic treatment may be a main factor that reduces electrolytic treatment efficiency and also causes formation of stains or spots on a surface of the stainless steel. Therefore, it is desirable to remove the bubbles generated during the electrolytic treatment. The bubbles generated on the surfaces of the electrode and the stainless steel may be mechanically removed by allowing a solution to flow in an electrolytic bath during the electrolytic treatment. As a method of allowing the solution to flow in the electrolytic bath, the sulfuric acid solution is preferably circulated by a pump so that the sulfuric acid solution is sprayed through a nozzle in a direction of the surfaces of the electrode and the stainless steel.

Meanwhile, after the second film modification step 200, the method of manufacturing a stainless steel for a fuel cell separator plate in accordance with one exemplary embodiment of the present disclosure further includes dipping the first passive film in a mixed acid solution, in which nitric acid and hydrofluoric acid are mixed, to form a new film (the third film modification step 400). That is, the second passive film 25 is also formed by subjecting the stainless base material 10, from which the first passive film 20 is removed and on which the chromium-concentrated layer 15 is formed, to the third film modification step 400 in which the first passive film is dipped into the mixed acid solution including nitric acid and hydrofluoric acid.

For example, in the third film modification step 400, concentrations of nitric acid and hydrofluoric acid in the mixed acid solution are preferably in a range of 100 to 200 g/L and to 70 g/L or less, respectively, and a temperature of the solution is preferably in a range of 40 to 60° C.

In the third film modification step 400, selective elution of Fe in the stainless steel base material 10 and dissolution of insoluble Si oxides remaining on a surface of the stainless base material 10 occur at the beginning of the dipping into the mixed acid solution to increase the Cr ratio on the surface of the stainless base material 10. An increase in surface potential of the stainless steel is caused as the second passive film 25, which is a new film, is formed by concentrated Cr after the dipping.

When the concentration of nitric acid in the mixed acid solution is too low, an effect of reducing contact resistance may be degraded due to a small increase in Cr ratio on the surface of the stainless base material 10 or a low effect in forming a new passive film. On the other hand, when the concentration of nitric acid is very high, an effect of increasing the Cr ratio on the surface of the stainless base material 10 may be saturated, or an effect of reducing contact resistance may be rather degraded due to serious erosion of the stainless steel base material 10. Therefore, the concentration of nitric acid in the mixed acid solution is preferably limited to 100 to 200 g/L.

In the third film modification step 400, the insoluble oxides which have not been removed in the previous step may be eliminated or removed through direct dissolution by hydrofluoric acid or elution of the stainless steel base material 10.

Also, hydrofluoric acid serves to aid in reacting with eluted metal ions to remove the metal ions, thereby enhancing an effect of nitric acid. Therefore, when the insoluble oxides do not exist or the effect of nitric acid is sufficiently exhibited, the concentration of hydrofluoric acid in the third film modification step 400 is set to 0. When the concentration of hydrofluoric acid is too high, serious erosion of the stainless steel base material 10 may be caused. Therefore, an upper limit of the concentration of hydrofluoric acid is preferably limited to 70 g/L.

In the third film modification step 400, when the temperature of the mixed acid solution is less than 40° C. or greater than 60° C., an effect of forming a new passive film may be degraded. Therefore, it is desirable to limit the temperature of the mixed acid solution.

When the temperature of the sulfuric acid solution is less than 40° C., an effect of removing the passive film may be degraded. In this case, an upper limit of the temperature is preferably limited to 80° C. in consideration of safety.

Accordingly, the interfacial contact resistance at a contact pressure of 100 N/cm$^2$ may be maintained at 10 mΩcm$^2$ or less. Also, when the corrosion potential of 0.4 V$_{SCE}$ or more is ensured, the fuel cell separator plate having an interfacial contact resistance less than or equal to a commercialized target value may be achieved.

Therefore, the first passive film 25 may have an interfacial contact resistance of greater than 10 mΩcm$^2$ (100 N/cm$^2$), and the second passive film 20 re-formed through a surface modification process may have an interfacial contact resistance of 10 mΩcm$^2$ (100 N/cm$^2$) or less. That is, the stainless steel for a fuel cell separator plate in accordance with one exemplary embodiment of the present disclosure may include a highly conductive passive film.

Hereinafter, the present disclosure will be described in further detail with reference to embodiments thereof.

Example 1

A cold-rolled sheet having a thickness of 0.1 mm, which was subjected to bright annealing heat treatment under a reducing atmosphere including hydrogen (75 vol %) and nitrogen (25 vol %) after a ferrite-based stainless steel including Cr at 30 wt % (wt %) was cold-rolled using a cold rolling mill (i.e., a Z-mill), was subjected to first and second film modifications in a sulfuric acid solution under the conditions of Inventive Example 1 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 2

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 2 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 3

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 3 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 4

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 4 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 5

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 5 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 6

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 6 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 7

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 7 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 8

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 8 listed in the following Table 1, and then subjected to a third film modification process in which the sheet was dipped in a mixed acid solution including nitric acid and hydrofluoric acid. Thereafter, physical properties of the cold-rolled sheet were evaluated.

Example 9

A cold-rolled sheet having a thickness of 0.1 mm was manufactured under the same conditions as in Example 1, except that the cold-rolled sheet was subjected to first and second film modifications in a sulfuric acid solution under the conditions of Inventive Example 9 listed in the following Table 1, and then subjected to a third film modification process in which the sheet was dipped in a mixed acid solution including nitric acid and hydrofluoric acid. Thereafter, physical properties of the cold-rolled sheet were evaluated.

Comparative Example 1

A cold-rolled sheet having a thickness of 0.1 mm, which was subjected to bright annealing heat treatment under a reducing atmosphere including hydrogen (75 vol %) and nitrogen (25 vol %) after a ferrite-based stainless steel including Cr at 30 wt % (wt %) was cold-rolled using a cold rolling mill (i.e., a Z-mill), was manufactured, and physical properties of the cold-rolled sheet was then evaluated.

Comparative Example 2

A cold-rolled sheet having a thickness of 0.1 mm, which was subjected to bright annealing heat treatment under a reducing atmosphere including hydrogen (75 vol %) and nitrogen (25 vol %) after a ferrite-based stainless steel including Cr at 30 wt % (wt %) was cold-rolled using a cold rolling mill (i.e., a Z-mill), was subjected to a first film modification process in a sulfuric acid solution under the conditions of Comparative Example 2 listed in the following Table 1, and physical properties of the cold-rolled sheet was then evaluated.

TABLE 1

| | First Film Modification Step | | | Second Film Modification Step | |
|---|---|---|---|---|---|
| | Sulfuric Acid Concentration (g/L) | Sulfuric Acid Temperature (° C.) | $|E_{cathode}| + |E_{anode}|$ | Sulfuric Acid Concentration (g/L) | Sulfuric Acid Temperature (° C.) |
| Inventive Example 1 | 150 | 40 | 2.3 | 150 | 40 |
| Inventive Example 2 | 150 | 50 | 2.5 | 150 | 50 |

TABLE 1-continued

| | | | | | |
|---|---|---|---|---|---|
| Inventive Example 3 | 150 | 50 | 2.5 | 150 | 55 |
| Inventive Example 4 | 150 | 70 | 2.4 | 150 | 65 |
| Inventive Example 5 | 150 | 70 | 2.4 | 150 | 70 |
| Inventive Example 6 | 180 | 70 | 2.3 | 180 | 70 |
| Inventive Example 7 | 230 | 70 | 2.2 | 230 | 70 |
| Inventive Example 8 | 180 | 50 | 2.5 | 180 | 70 |
| Inventive Example 9 | 200 | 70 | 2.3 | 200 | 70 |
| Comparative Example 1 | — | — | — | — | — |
| Comparative Example 2 | 150 | 70 | 2.3 | — | — |

| | Third Film Modification Step | | | | |
|---|---|---|---|---|---|
| | Nitric Acid Concentration (g/L) | Hydrofluoric Acid Concentration (g/L) | Mixed Acid Temperature (° C.) | Contact Resistance (mΩcm$^2$ (100 N/cm$^2$) | Corrosion Resistance |
| Inventive Example 1 | 150 | 50 | 50 | 10.0 | Good |
| Inventive Example 2 | 150 | 50 | 50 | 9.8 | Good |
| Inventive Example 3 | 150 | 50 | 50 | 9.3 | Good |
| Inventive Example 4 | 150 | 50 | 50 | 7.2 | Good |
| Inventive Example 5 | 150 | 50 | 50 | 6.4 | Good |
| Inventive Example 6 | 150 | 50 | 50 | 5.8 | Good |
| Inventive Example 7 | 150 | 50 | 50 | 5.3 | Good |
| Inventive Example 8 | 150 | 50 | 50 | 6.5 | Good |
| Inventive Example 9 | 150 | 50 | 50 | 5.1 | Good |
| Comparative Example 1 | — | — | — | 120 | Poor |
| Comparative Example 2 | — | — | — | 18.6 | Poor |

Table 1 lists $|E_{anode}|+|E_{cathode}|$ values, contact resistances, and corrosion resistances of the individual materials according to the conditions for a process of modifying a surface of a ferrite-based stainless sheet including Cr at 30 wt %.

In this case, the contact resistance was evaluated, as follows. The manufactured material having a thickness of 0.1 mm was cut into two pieces having an area of 25 cm$^2$, and carbon paper (SGL-10BA) having an area of 4 cm$^2$, which was used as a gas diffusion layer, was then interposed therebetween to evaluate the interfacial contact resistance at a contact pressure of 100 N/cm$^2$. In this case, the evaluation was performed in quadruplicate.

Meanwhile, the corrosion resistance was evaluated, as follows. The manufactured steel sheet material having a thickness of 0.1 mm was dipped at 70° C. in a mixed solution, in which a concentration of 1 mole of sulfuric acid was mixed with 2 ppm of a hydrofluoric acid solution, under a fuel cell-operating environment to measure a potential of the material with respect to a SCE serving as a reference electrode. For the evaluation of the corrosion resistance, the corrosion potentials of 0.4 $V_{SCE}$ or more and less than 0.4 $V_{SCE}$ were judged to be good and poor, respectively.

As listed in Table 1, it can be seen that the material of Comparative Example 1, in which the cold-rolled sheet having a thickness of 0.1 mm was subjected to bright annealing heat treatment under a reducing atmosphere including hydrogen (75 vol %) and nitrogen (25 vol %) after the ferrite-based stainless steel was cold-rolled using a cold rolling mill (i.e., a Z-mill) but not subjected to film modification processes, had high contact resistance and a low corrosion potential due to the presence of the non-conductive passive film and a low Cr ratio in the film.

As described in Examples 1 to 9, it can be seen that all the $|E_{anode}|+|E_{cathode}|$ values in the first film modification step were greater than or equal to 2.0, and thus the anodic dissolution of the stainless steel caused uniform dissolution of the passive film in a high potential region of +1.0 $V_{SCE}$ or more, which contributed to a decrease in contact resistance.

As listed in Table 1, it can be seen that the higher the temperature of the sulfuric acid solution was, the higher the effect of reducing contact resistance was. From these facts, it can be seen that the higher the temperature of the sulfuric acid solution in the first film modification step was, the superior the effect of removing the non-conductive passive film was, and that the higher the temperature of the sulfuric acid solution in the second film modification step was, the superior the effect of increasing the Cr ratio on the surface of the stainless base material was.

Also, as listed in Table 1, it can be seen that the higher the concentration of the sulfuric acid solution was, the lower contact resistance was ensured. However, referring to Examples 7 and 9, it can be seen that the effect of reducing contact resistance according to an increase in concentration was saturated or slight when the concentration of the sulfuric acid solution increased to 200 g/L or more. Therefore, an upper limit of the concentration of the sulfuric acid solution was preferably limited to 300 g/L in consideration of the economic feasibility and the effect of reducing contact resistance.

TABLE 2

|  | Cr/Fe Ratio in Passive Film | Cr/Fe Ratio at Interface Between Passive Film and Stainless Base Material | Cr/Fe Ratio of Region of Stainless Base Material with a Thickness of 1 nm or Less Adjacent to Interface Between Stainless Base Material and Passive Film | Si Ratio (at %) in Passive Film |
|---|---|---|---|---|
| Example 1 | 1.19 at % | 0.70 at % | 0.49 at % | Undetected |
| Example 5 | 1.26 at % | 0.72 at % | 0.52 at % | Undetected |
| Example 9 | 1.58 at % | 0.87 at % | 0.56 at % | Undetected |
| Comparative Example 1 | 0.42 at % | 0.44 at % | 0.44 at % | 0.55 at % |
| Comparative Example 2 | 0.75 at % | 0.64 at % | 0.43 at % | 0.26 at % |

Table 2 lists Cr/Fe atomic weight ratios of scales and base materials around the scales and Si contents (atomic %, at %) in the scales of the stainless steel sheets manufactured in the examples and comparative examples of the present disclosure.

As listed in Table 2, it can be seen that the new films, in which the bright-annealed passive film was removed through the first and second film modification steps, resulting in increased Cr ratio on a surface of the stainless steel and the Cr content increased through the third film modification step, were formed.

Also, it can be seen that the Cr/Fe ratio had a high value at a region spaced apart 1 nm from the passive film and the interface between the passive film and the stainless base material in a direction of the base material. This was made by removing the bright-annealed passive film in the first film modification step and increasing the Cr ratio on the surface of the stainless base material due to the selective elution of Fe during the second film modification step.

The interface between the passive film and the stainless base material listed in Table 2 was considered to refer to a point at which a content of oxygen accounted for 50% with respect to the maximum content of oxygen after the elemental distribution was determined in a thickness direction of the stainless steel sheet.

As listed in Table 2, the Si content (atomic %, at %) in the passive film was not detected in Examples 1, 5 and 9. The Si oxides was able to be removed in the third film modification step, and a decrease in content of insulating Si oxides contributed significantly to improvement of electrical conductivity.

As described above, it can be seen that, when the non-conductive, bright-annealed passive film is removed through the first film modification step and the Cr ratio on a surface of the stainless steel increases through selective elution of Fe in the second film modification step, the stainless steel for a fuel cell separator plate manufactured in accordance with the embodiments of the present disclosure may significantly improve the interfacial contact resistance and corrosion resistance, compared to those of the comparative examples, by removing the residual insoluble Si oxides by dipping in the mixed acid solution including nitric acid and hydrofluoric acid and forming a conductive film having a high Cr ratio.

Although a few embodiments of the present disclosure have been shown and described, it would be appreciated by those skilled in the art that various modifications and changes may be made in these embodiments without departing from the principles and spirit of the disclosure, the scope of which is defined in the claims and their equivalents.

INDUSTRIAL APPLICABILITY

Stainless steel for fuel cell separator plate and manufacturing method therefor in accordance with the embodiments of the present disclosure are applicable to a separator plate for a polymer fuel cell.

The invention claimed is:

1. A stainless steel for a fuel cell separator plate comprising:
   a stainless base material and
   a passive film formed on the stainless base material, wherein a content of Si atoms in the passive film is less than or equal to 0.1 at %, a Cr/Fe atomic weight ratio in the passive film is greater than or equal to 1.0, the passive film has an interfacial contact resistance of 10 mΩcm.sup$^2$ (100 N/cm$^2$) or less, and the passive film has a corrosion potential of 0.3 $V_{SCE}$ or more,
   wherein the Cr/Fe atomic weight ratio at an interface between the stainless steel base material and the passive film is greater than or equal to 0.65,
   wherein the interface between the stainless base material and the passive film refers to a point in the stainless steel at which a content of oxygen accounted for 50% with respect to a maximum content of oxygen as determined in an elemental distribution measured in a thickness direction of the stainless steel, and
   wherein the stainless base material at a region starting from 0.5 nm from the interface between the stainless base material and the passive film to 1 nm from the interface between the stainless base material and the passive film after film modification has a Cr/Fe atomic weight ratio of 0.45 or more.

2. The stainless steel for a fuel cell separator plate of claim 1, wherein the stainless steel for a fuel cell separator plate comprises C at greater than 0 to 0.02 wt %, N at greater than 0 to 0.02 wt %, Si at greater than 0 to 0.4 wt %, Mn at greater than 0 to 0.2 wt %, P at greater than 0 to 0.04 wt %, S at greater than 0 to 0.02 wt %, Cr at 25 to 34 wt %, Mo at 0 to less than 0.1 wt %, Cu at 0 to 1 wt %, Ni at 0 to less than 0.2 wt %, Ti at greater than 0 to 0.5 wt %, Nb at greater than 0 to 0.5 wt %, and the balance of Fe and other inevitable impurities.

3. The stainless steel for a fuel cell separator plate of claim 1, wherein the passive film has a thickness of 3.5 nm or less (excluding 0).

4. A stainless steel for a fuel cell separator plate comprising:
- a stainless base material and
- a passive film formed on the stainless base material, wherein a content of Si atoms in the passive film is less than or equal to 0.1 at %, a Cr/Fe atomic weight ratio in the passive film is greater than or equal to 1.0, and the passive film has a corrosion potential of 0.3 $V_{SCE}$ or more,
- wherein the Cr/Fe atomic weight ratio at an interface between the stainless steel base material and the passive film is greater than or equal to 0.65,
- wherein the stainless base material at a region starting from 0.5 nm from the interface between the stainless base material and the passive film to 1 nm from the interface between the stainless base material and the passive film after film modification has the Cr/Fe atomic weight ratio of 0.45 or more, and
- wherein the interface between the passive film and the stainless base material refers to a point in the stainless base material at which a content of oxygen accounted for 50% with respect to a maximum content of oxygen as determined in an elemental distribution measured in a thickness direction of the stainless steel, and
- wherein the stainless steel for the fuel cell separator plate comprises C at greater than 0 to 0.02 wt %, N at greater than 0 to 0.02 wt %, Si at greater than 0 to 0.4 wt %, Mn at greater than 0 to 0.2 wt %, P at greater than 0 to 0.04 wt %, S at greater than 0 to 0.02 wt %, Cr at 25 to 34 wt %, Mo at 0 to less than 0.1 wt %, Cu at 0 to 1 wt %, Ni at 0 to less than 0.2 wt %, Ti at greater than 0 to 0.5 wt %, Nb at greater than 0 to 0.5 wt %, and the balance of Fe and other inevitable impurities.

\* \* \* \* \*